United States Patent [19]

Wirth et al.

[11] Patent Number: 5,146,073
[45] Date of Patent: Sep. 8, 1992

[54] LINEAR WAVEFRONT SENSOR CAMERA WITH DEFORMABLE MIRROR FOR RECORDING VELOCITY COMPENSATED IMAGES

[75] Inventors: Allan Wirth, Bedford; Andris Jankevics, Action, both of Mass.

[73] Assignee: United Technologies Corporation, Hartford, Conn.

[21] Appl. No.: 704,472

[22] Filed: May 23, 1991

[51] Int. Cl.$^5$ ................................ G01J 1/20
[52] U.S. Cl. .................. 250/201.9; 356/121; 358/109
[58] Field of Search .......... 250/201.9, 208.1; 356/121; 358/222, 109

[56] References Cited

U.S. PATENT DOCUMENTS

| | | | |
|---|---|---|---|
| 4,666,298 | 5/1987 | Protz | 356/121 |
| 4,996,412 | 2/1991 | Arafi et al. | 250/201.9 |
| 5,026,977 | 6/1991 | Hubbard, Jr. | 250/201.9 |

Primary Examiner—David C. Nelms
Assistant Examiner—Que T. Le

[57] ABSTRACT

An optical system that records images that travel through a turbulent atmosphere to a camera on a moving platform is designed to sense image distortions in a first segment of the image and to apply a set of correction signals to a segment of a deformable mirror that corresponds to the portion of the image that is detected. In a closed-loop embodiment, the corrected subimage is followed across the aperture, with successive corrections being applied sequentially to each of a set of segments at the time when that segment is reflecting the subimage in question. Consecutive subimages follow the same procedure. Corrected subimages are reflected off the deformable mirror to a detector array. At intervals, a frame's worth of data may be read out of the detectors and stored.

4 Claims, 3 Drawing Sheets

LINEAR WAVEFRONT SENSOR CAMERA WITH DEFORMABLE MIRROR FOR RECORDING VELOCITY COMPENSATED IMAGES

TECHNICAL FIELD

The field of the invention is that of recording optical images from a moving platform through a turbulent atmosphere.

BACKGROUND ART

The field of optical corrections or adaptive optical systems has been extensively developed. One such system is that disclosed in U.S. Pat. No. 4,727,621, which shows a system in which an input wavefront is sensed to determine distortions in the wavefront and the sensed signals are converted to control signals on a deformable mirror that reflects the same input wavefront to provide corrections to the measured distortions.

A common problem in systems of this type is the necessity to do calculations over the entire aperture in real time, which imposes extreme demands on the computational equipment being used.

An application of these systems that has not previously been solved or attempted is that of taking pictures from an aircraft. Since an airplane moves at high speed through a turbulent atmosphere, it is very difficult both to measure the turbulence that is affecting the image and to correct the turbulence quickly enough so that the image may be corrected before the aircraft has passed the turbulence by.

DISCLOSURE OF INVENTION

The invention relates to a simplified optical system for recording (either electronically or photographically) a scene from a moving platform that is passing through a turbulent atmosphere.

Other features and advantages will be apparent from the specification and claims and from the accompanying drawings which illustrate an embodiment of the invention.

BEST MODE FOR CARRYING OUT THE INVENTION

Figure 1:
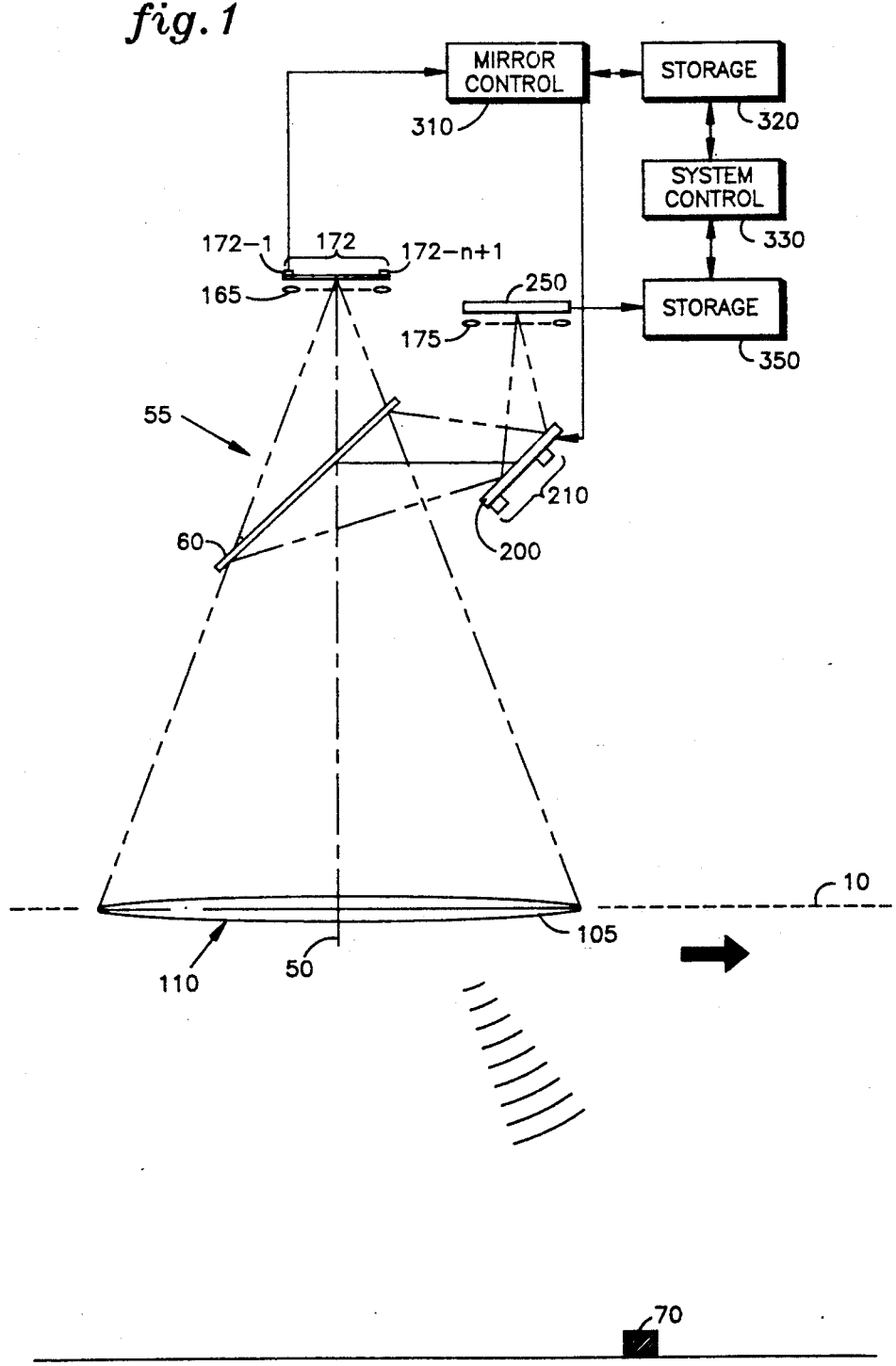
FIG. 1 illustrates an embodiment of the invention.

Referring now to FIG. 1, there is shown in partially pictorial, partially schematic form an open loop embodiment of the invention in which a portion of a platform 10 denoted by a dotted line passes in a direction given by an arrow over a scene containing one picture element, referred to by the numeral 70. The following description will describe how distortion affects the image of the scene element and how it may be corrected. An aperture 110 in the platform serves to define the input aperture of the system. The first element of the system may be a lens or a mirror 105 that is positioned on a first optic axis 50. Radiation from scene element 70 passes through aperture 110 and is focused by lens 105 onto a first image plane 170.

Image plane 170 contains an array of linear subapertures denoted by the numeral 165 which are positioned perpendicular to the paper in this Figure. Illustratively, there are 30 rows of 30 subapertures each for a total of 900 subapertures. Each of the apertures in array 165 contains a lens that forms a focus of the scene on a corresponding detector sub-array 172-1, 172-2, etc., which is part of detector array 172. An example of such lenses is a micro lenslet array available from Adaptive Optics Associates of Cambridge Mass. Within detector array 172 there may be a subarray of 8×8 individual optical pixel detectors in a conventional rectangular arrangement.

These individual pixel detectors produce signals that correspond to a representation of the electrical field in the incoming wavefront, corresponding to the input radiation after the fashion of a conventional Hartmann detector. Since the scene is typically extended, a correletion type tracking algorithm may be used to measure the subaperture gradients. Thus, for each of the subapertures in the linear array 165, the full two dimensional wavefront gradient is sensed.

Also, as is conventional, a beamsplitter denoted schematically by the dotted line labeled 60, deflects a portion of the input radiation to a deformable mirror 200 positioned in plane 175. Plane 175 is arranged to be optically conjugate to the turbulent layers of the atmosphere. Plane 175 is illustrated as being at a 45 degree angle with respect to second optical axis 55 in the drawing for convenience in illustration. In an embodiment of the invention, the elements will be packed together in a compact manner and the angles will not bear any particular relation to this schematic drawing.

The function of deformable mirror 200 is to correct for the wavefront distortions in the atmosphere according to signals coming from mirror control unit 310 which, operating by conventional Hartmann algorithms, responds to the signals from detector array 172 to generate a corresponding set of control signals for a corresponding set of actuators in mirror 200. Each actuator preferably corresponds to one subaperture of array 172, though economic considerations may require that the number of actuators be smaller. The method of converting from input electrical signals from array 172 to deformable mirror control signals is that of the sort illustrated in the prior art patents.

Radiation reflecting off deformable mirror 200 then passes to detector array 250 which may be a camera film or preferably a rectangular array of photodetectors. Detector array 250 should be at the focal plane of the system, with deformable mirror 200 being in front of the focal plane. Signals coming from detector array 250 are passed to storage unit 350.

If the platform were stationary, a system of this sort would be able to operate in a period of time that is relatively long, being about 1 msec for a typical wind velocity of about 10 m/sec. In the case where the platform is moving, there is an additional constraint that may be illustrated by a numerical example. It has been observed that a typical cell of turbulence in the atmosphere is about 1 centimeter in diameter and the distortion in optical path length from such a cell amounts to about 0.25 $\mu$m due to turbulence near the aircraft, or about 0.5 $\mu$m if the path length distortion is accumulated between the ground and the aircraft. For illustration, let entrance pupil 105 be 30 centimeters in diameter and the platform be moving at 200 meters per second. For the given set of numbers, the shadow of a turbulent cell will move all the way across its own diameter in 50 $\mu$sec. This determines the operating time scale for effective image compensation. It will be necessary to measure and to respond to distortion in that time.

With the numbers given, the time required for a turbulent cell in the aircraft flow field to move all the across the input aperture of the optical system is 1.5 msec. The time scale for the evolution of a turbulent cell is 10 to 100 msec, depending on the particular parameters of the atmosphere at the time. This implies that the wavefront distortion pattern due to turbulence is slow or stationary, relative to the motion of the aircraft through the atmosphere. Thus, those skilled in the art will appreciate that if the distortions are measured in array 172 when the image of the distortion first enters the aperture, then the correction signals for those distortions may be applied sequentially to a set of corresponding linear actuator arrays on deformable mirror 200. These arrays will be denoted by the numeral 210-1, 210-2, etc., up to 210-n.

Thus, if the input image plane 170 is divided into n+1 segments, the first one being covered by detector subarray 172-1 at time T=0, then after the first period of 50 μs (time T=50 μs) the measured compensation signals may be applied to the first actuator array 210-1. This set of correction signals is stored in storage means 320 after being first computed and then is sequentially applied to the next array of actuators 210-2 at time T=100 μs, etc. The signals are applied under control of system controller 330, which sends control signals to the storage unit 320 and to other associated switching systems to sequentially apply the correct control signals to one actuator array after another. At a time T=n(50 μs) all the actuators in mirror 200 have been set and a frame of data from array 250 is sent to storage means 350.

Suitable deformable mirrors and actuators having a fast response time for using with the invention are illustrated in U.S. Pat. Nos. 4,441,791, 4,710,732, or 4,229,732. Another suitable deformable mirror is that illustrated in AFWL-TR-86-127 report entitled "Deformable Mirror Type Spatial Light Modulator with Parallel Transport".

Suitable arrays of optical elements 165 are the microlenslet modules available from Adaptive Optics, Associates of Cambridge, Mass. Suitable detector arrays are those such as the switched photodiode arrays available from EG&G Reticon of Sunnyvale Calif. The functions of the control system may be accomplished by a suitably programmed digital computer or by a special purpose digital system. The storage may be effected by conventional memory systems.

Figure 2:
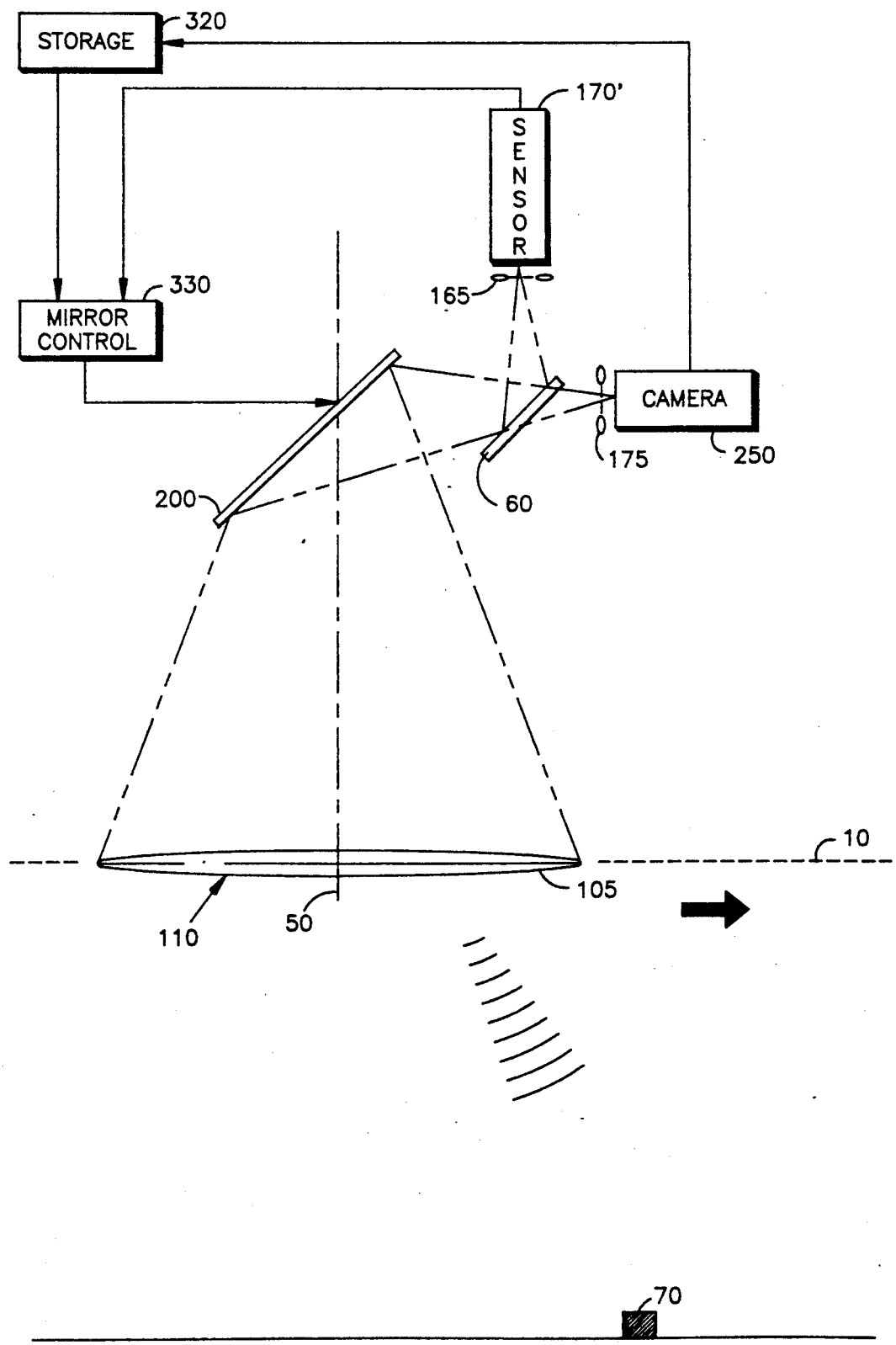
FIG. 2 illustrates an alternative embodiment of the invention.

Referring now to FIG. 2, there is shown an alternative closed-loop embodiment of the invention, in which similar elements have the same numerals as in FIG. 1. In this embodiment, deformable mirror 200 is common to both camera 250 and sensor array 172'. This is a closed-loop system, in which mirror control 330 sequentially adjusts the control of deformable mirror 200 as control signals are passed along the surface of the mirror to sequential sets of actuators. The operation of the system may be illustrated with reference to Table 1, showing the location of sensed signals and control signals during the time taken to record two frames. Suppose that mirror 200 has N linear actuator arrays of actuators positioned with actuator array axes perpendicular to the plane of the paper. Similarly, camera 250 has N linear detector arrays of pixel detectors positioned with detector array axes perpendicular to the plane of the paper. Each of these arrays will have a rectangular sub-array of pixel detectors to record the light reflected off the corresponding portion of deformable mirror 200. Sensor array 172' has a counterpart set of N+1 linear arrays of sensors, with the extra array of sensors being positioned to receive a sub-image travelling across the aperture before it reaches the first linear array in the deformable mirror or the camera.

As the platform moves, new portions of the image enter the aperture and pass over the sensor array and the deformable mirror and camera. As is indicated it Table 1, the first linear array in the sensor array receives a new image portion in a first time interval T =0. The control signals corresponding to the turbulence or other distortion detected in that sub-image result in deformable mirror control signals that are applied to the first actuator set in the deformable mirror in the second time interval. Also in the second time interval, the camera is sensing the first sub-image and the second linear array of the sensor is responding to the first sub-image while the first linear array of the sensor is responding to a new sub-image. The process is repeated as the image passes over the aperture, with the first n arrays of the sensor responding to a set of n subimages while the first n−1 linear actuator sets of the deformable mirror respond to current control signals and the first n−1 arrays of the camera generate signals that may be stored after each time interval or only after an entire frame is available. The control signals applied to the nth actuator set of the deformable mirror will have been modified n times as each linear array in the sensor responds to the (slightly) changing distortion and to the result of the previous n−1 corrections.

The initial frame is sensed and manipulated in time intervals T=0 to T=N. The second frame is sensed and manipulated in time intervals T=1 to T=N in the portion of the table separated by the double lines. In the second, third, etc. frame, all sensor arrays, actuator arrays, and camera arrays are working simultaneously in pipeline fashion. The process of recording data from the camera may be done a frame at a time or after each time interval, as is preferred.

TABLE 1

| Time | Position | | |
|---|---|---|---|
| | Sensor | D M | Camera |
| | Frame 1 | | |
| T = 0 | 1 | — | — |
| T = 1 | 2,1 | 1 | 1 |
| T = 2 | 3,2,1 | 2,1 | 2,1 |
| T = n | n,n − 1,— —,2,1 | n − 1,n − 2,— —,2,1 | n − 1,n − 2,— —,2,1 |
| T = N − 1 | N,N − 1,— —,2,1 | N − 1,—,2,1 | N − 1,—,2,1 |
| T = N | N + 1,N,N − 1,— —,2,1 | N,N − 1,— —,2,1 | N,N − 1,— —,2,1 |
| | Frame 2 | | |
| T = 1 | N + 1,N,N − 1,— —,2,1 | N,N − 1,— —,2,1 | N,N − 1,— —,2,1 |
| T = N | N + 1,N,N − 1,— —,2,1 | N,N − 1,— —,2,1 | N,N − 1,— —,2,1 |

Figure 3:
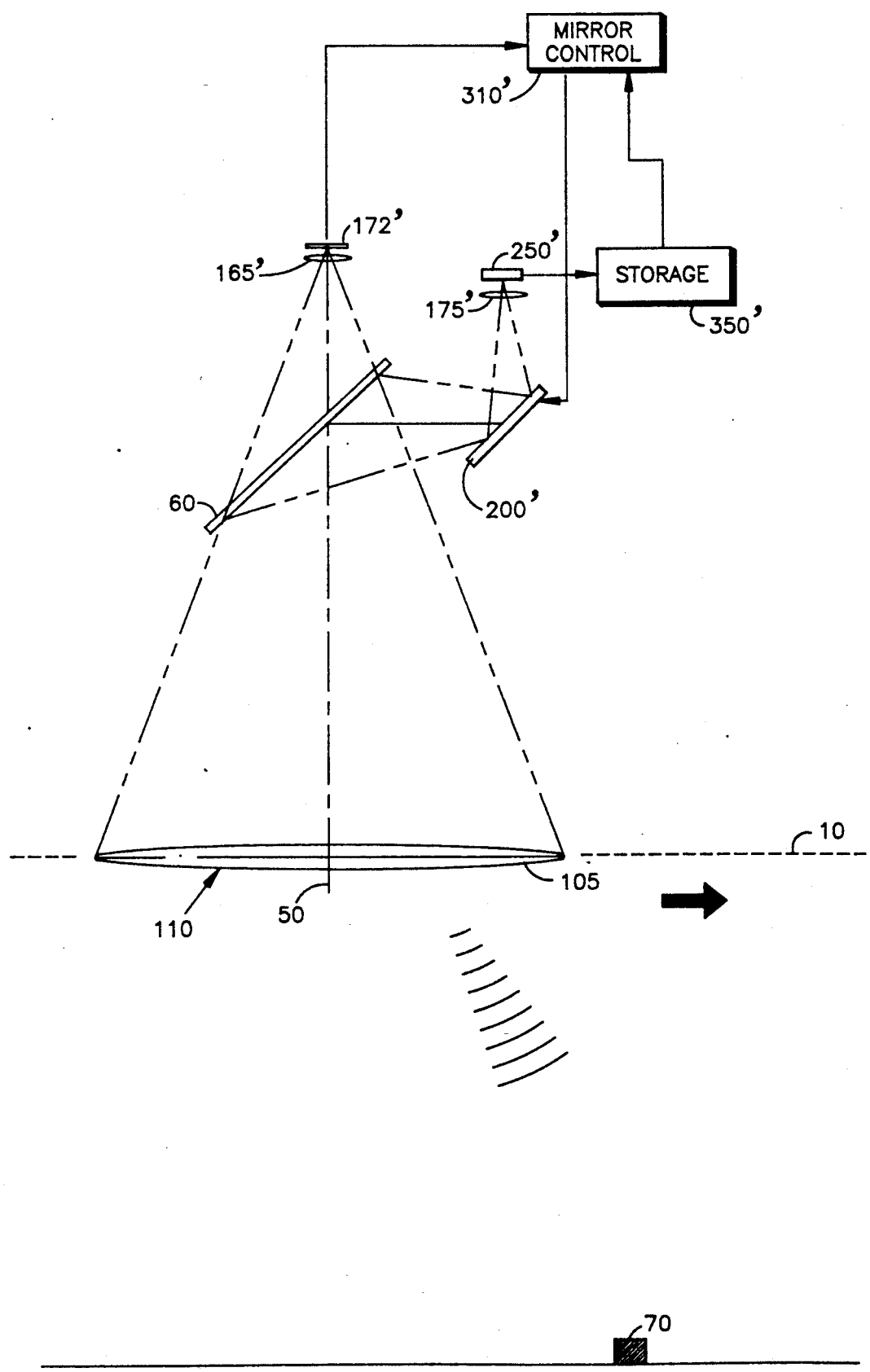
FIG. 3 illustrates another alternative embodiment of the invention.

An alternate embodiment of the invention shown in FIG. 3 is the use of a detector 172' which is a strip of detectors that corresponds to the strip measured by detector 172-1 and a smaller deformable mirror 200' having only a single set of actuators instead of a rectangular array. In this case, the signals from detector array 172' after being processed by mirror control 310' are applied to the single strip deformable mirror to generate the corrected radiation beam at time T=50 μs. This corrected beam then strikes a corresponding strip detector array 250'. (250 will have a greater number of pixels, of course, because they are responding to the entire scene not to the focal spot from lenses 165.) Data from each strip is stored in unit 350 every 50 μs. After a time n(50 μs), there is a set of stored data that corresponds to the data that would be transmitted in the previous embodimemnt. The scene is thus effectively scanned, strip by strip, and also recorded, strip by strip, instead of being recorded simultaneously. This method of recording is similar to the alternative method of the previous embodiment, with the difference that the image is corrected only once. The stored strips are stored in storage means 350 for later processing. This self scanning arrangement is particularly suited to the correction of image distortion due to low lying atmospheric turbulence. Such turbulence is effectively in the same plane as the scene and thus tracks across the sensor and detector array in step with the scene. Further, since the turbulence is close to the scene, analysis shows that the majority of the image degradation is due to full aperture tilt with a very small isoplanatic angle. This may readily be rorrected using a deformable mirror near the focus of the optical imaging system.

It should be understood that the invention is not limited to the particular embodiments shown and described herein, but that various changes and modifications may be made without departing from the spirit and scope of this novel concept as defined by the following claims.

We claim:

1. An optical system for recording compensated images from a moving platform travelling with a predetermined velocity along a platform axis, comprising:
   input aperture determining means positioned along a first optic axis having a predetermined relationship to said platform axis for passing optical radiation from an exterior scene through a system aperture into said optical system;
   means for focussing radiation from a predetermined linear portion of said scene through a linear array of subapertures of said system aperture onto a linear array of wavefront sensing subdetectors, each wavefront sensing subdetector corresponding to one of said subapertures and comprising a set of individual pixel detectors for measuring radiation impinging on individual pixels within said one of said subdetectors and generating a set of pixel subdetector electrical signals responsive thereto;
   beamsplitter means positioned along said first optic axis for deflecting a portion of said radiation from said linear portion of said scene onto a deformable mirror positioned along a second optical axis passing through said beamsplitter means;
   mirror control means, connected to said linear array of wavefront sensing subdetectors and to said deformable mirror, for generating deformable mirror array control signals for controlling a linear array of deformable mirror actuators corresponding optically to said linear array of wavefront sensing subdetectors in response to said pixel subdetector electrical signals;
   image detecting means positioned in an image plane disposed to receive corrected radiation reflected and corrected by said deformable mirror in response to said mirror control means for detecting said corrected radiation and generating image detector electrical signals in response thereto; and
   signal storage means for storing at least one set of stored deformable mirror control signals from said mirror control means and applying said set of stored deformable mirror control signals to said deformable mirror under control of system control means.

2. A system according to claim 1, in which said linear array of subapertures, said linear array of sensing subdetectors, and said linear array of deformable mirror actuators each comprise a plurality of columns of subapertures, sensing subdetectors and corresponding columns of actuators that together define an image frame; and
   in which said image detecting means comprises sufficient pixel detectors to receive radiation in said image frame simultaneously.

3. A system according to claim 2, in which said linear array of sensing subdetectors sequentially generates a set of linear array signals as consecutive linear portions of a frame pass thereover, each of said set of linear array signals being sequentially applied to said mirror control means and a corresponding set of linear array control signals being sequentially applied to successive columns of said set of mirror actuators, each corresponding set of linear array control signals in a frame being successively corrected by said mirror control means in response to an updating set of linear array signals, whereby radiation in a linear portion of said scene is successively corrected as it passes over a plurality of columns of said linear array of mirror actuators.

4. A system according to claim 1, in which said linear array of sensing subdetectors comprises a single column of sensing subdetectors that sequentially generates a set of linear array signals as consecutive linear portions of a frame pass thereover, each of said set of linear array signals being sequentially applied to said mirror control means and to a corresponding single set of linear array deformable mirror actuators and in which column radiation sequentially reflected from said single set of linear array deformable mirror actuators is detected in a single image detecting column in said image detecting means.

* * * * *